(12) United States Patent
Narayan et al.

(10) Patent No.: US 6,185,313 B1
(45) Date of Patent: *Feb. 6, 2001

(54) METHOD AND APPARATUS FOR PRINTING COPY RESTRICTIVE DOCUMENTS HAVING INDIVIDUAL KEYCODES

(75) Inventors: Badhri Narayan; Nelson A. Blish, both of Rochester, NY (US)

(73) Assignee: Eastman Kodak Company, Rochester, NY (US)

( * ) Notice: Under 35 U.S.C. 154(b), the term of this patent shall be extended for 0 days.

This patent is subject to a terminal disclaimer.

(21) Appl. No.: 09/126,146

(22) Filed: Jul. 30, 1998

(51) Int. Cl.$^7$ ..................................................... G03G 21/00
(52) U.S. Cl. .......................... 382/100; 382/199; 382/234; 382/244; 399/366
(58) Field of Search .............................. 382/100; 395/491; 235/468; 283/93, 902; 285/93; 399/366; 358/298; 430/10; 347/136, 240; 380/51; 355/133

(56) References Cited

U.S. PATENT DOCUMENTS

| | | | |
|---|---|---|---|
| 4,694,148 | * 9/1987 | Diekemper et al. | 235/468 |
| 4,985,779 | * 1/1991 | Gall | 358/298 |
| 5,018,767 | 5/1991 | Wicker | 283/67 |
| 5,193,853 | 3/1993 | Wicker | 283/85 |
| 5,231,663 | 7/1993 | Earl et al. | 382/159 |
| 5,379,093 | 1/1995 | Hashimoto et al. | 399/366 |
| 5,390,003 | 2/1995 | Yamaguchi et al. | 399/366 |
| 5,412,718 | 5/1995 | Narasimhalu et al. | 705/51 |
| 5,444,779 | 8/1995 | Daniele | 399/366 |
| 5,577,774 | * 11/1996 | Morikawa et al. | 283/93 |
| 5,623,637 | * 4/1997 | Jones et al. | 395/491 |
| 5,752,152 | * 5/1998 | Gasper et al. | 399/366 |
| 5,754,218 | * 5/1998 | Baek et al. | 347/240 |
| 5,768,674 | 6/1998 | Gasper et al. | 399/366 |
| 5,772,250 | 6/1998 | Gasper | 283/114 |
| 5,810,396 | * 9/1998 | Kurata et al. | 285/93 |
| 5,936,652 | * 8/1999 | Narayan et al. | 347/136 |
| 5,951,055 | * 9/1999 | Mowry, Jr. | 283/93 |
| 6,001,516 | * 12/1999 | Gasper | 430/10 |

* cited by examiner

*Primary Examiner*—Matthew C Bella
*Assistant Examiner*—M. B. Choobin
(74) *Attorney, Agent, or Firm*—Milton S. Sales; David A. Novais; Nelson Adrian Blish

(57) ABSTRACT

A system for creating copy restrictive media is disclosed. The system comprises printing a first pattern of microdots (80) on a first set of documents and printing a second pattern of microdots (82) on a second set of documents. A first key code is associated with the first microdot pattern (80), which allows a copy machine to copy the first set of documents, and a second key code is associated with the second microdot pattern (82), which allows a copy machine to copy the second set of documents. This system allows individual copyright owner to insure that no one else is able to reproduce their copyrighted documents.

9 Claims, 9 Drawing Sheets

METHOD AND APPARATUS FOR PRINTING COPY RESTRICTIVE DOCUMENTS HAVING INDIVIDUAL KEYCODES

CROSS REFERENCE TO RELATED APPLICATIONS

The present application is related to U.S. patent application Ser. No. 08/593,772, filed Sep. 28, 1995, by Jay S. Schildkraut, et al., and titled, "Copy Protection System"; U.S. patent application Ser. No. 08/598,785, filed Feb. 8, 1996, by John Gasper, et al., and titled, "Copy Restrictive Documents"; U.S. patent application Ser. No. 08/598,446, filed Feb. 08, 1996, by Xin Wen, and titled, "Copyright Protection In Color Thermal Prints"; U.S. patent application Ser. No. 08/598,778, filed Feb. 8, 1996, by John Gasper, et al., and titled, "Copy Restrictive System"; U.S. patent application Ser. No. to be assigned, filed Apr. 10, 1997, by John Gasper, et al. and entitled "Copy Restrictive System for Color-Reversal Documents", U.S. patent application Ser. No. to be assigned, filed Apr. 10, 1997, by John Gasper, and entitled "Copy Restrictive Color-Reversal Documents" and "Apparatus for Copy Restrictive Media", U.S. Pat. No. 5,768,674, by Gasper et al.

FIELD OF THE INVENTION

The invention relates generally to the field of copy restriction, and in particular to an apparatus for applying microdots to media to restrict copying of material protected by copyright by other than the copyright owner.

BACKGROUND OF THE INVENTION

Copying of documents has been performed since the first recording of information in document form and is a valuable means of promulgating information. Unauthorized copying of documents has also been occurring since the storage of information in document form first began. For much of the history of information documentation, the procedures used to copy original documents have been sufficiently cumbersome and costly to provide a significant impediment to unauthorized copying, thus limiting unauthorized copying to original documents of high value. However, in more recent times the introduction of new technologies for reproducing original documents has decreased the cost and inconvenience of copying documents, thus increasing the need for an effective method of inhibiting unauthorized copying of a broader range of restricted documents.

The inability of convenient, low-cost copying technologies to copy original documents containing color or continuous tone pictorial information restricted unauthorized copying primarily to black-and-white documents containing textual information and line art. Recently, the introduction of cost effective document scanning and digital methods of signal processing and document reproduction have extended the ability to produce low cost copies of documents containing color and high quality pictorial information. It is now possible to produce essentially indistinguishable copies of any type of document quickly, conveniently, and cost effectively. Accordingly, the problem of unauthorized copying of original documents has been extended from simple black-and-white text to color documents, documents containing pictorial images, and photographic images. In particular, restricting the unauthorized duplication of photographic images produced by professional photographers on digital copying devices has recently become of great interest.

U.S. Pat. Nos. 5,193,853 and 5,018,767 by Wicker, disclose methods for restricting the unauthorized copying of original documents on devices utilizing opto-electronic scanning by incorporating spatially regular lines into the original document. The spacing of the lineations incorporated in the original document are carefully selected to produce Moiré patterns of low spatial frequency in the reproduced document allowing it to be easily distinguished from the original and degrading the usefulness of the reproduction. Although the Moiré patterns produced in the reproduced document are readily apparent to an observer, the required line pattern incorporated in the original document to produce the Moiré pattern upon copying is also apparent to an observer under normal conditions of use. Additionally, production of the Moiré pattern in the reproduced document requires that specific scanning pitches be employed by the copying device. Accordingly, this method of restricting copying unauthorized document copying is applicable only to documents such as currency or identification cards where the required line pattern can be incorporated without decreasing the usefulness of the document. Application of this technique to other high quality documents is unacceptable due to the degradation of quality and usefulness of the original document.

U.S. Pat. No. 5,444,779 by Daniele, discloses a method of preventing unauthorized copying by the printing of a two-dimensional encoded symbol in the original document. Upon scanning of the original document in an initial step of a copying process, the encoded symbol is detected in the digital representation of the original document and the copying process is either inhibited or allowed following billing of associated royalty fees. U.S. patent application Ser. No. 08/593,772, filed Sep. 28, 1995, by Schildkraut et al., and titled, "Copy Protection System," discloses the incorporation of a symbol of a defined shape and color into a document followed by detection of the symbol in a scanned representation of the document produced by the copying device. In both disclosures, the incorporated symbol is detectable by an observer under normal conditions of use and readily defeated by cropping the symbol from the original document prior to copying. In addition, incorporation of the symbol into the document is required in the generation of the original document leading to undesired inconvenience and additional cost. Accordingly, these methods of imparting restriction from unauthorized copying are unacceptable.

U.S. Pat. No. 5,390,003 by Yamaguchi, et al.; U.S. Pat. No. 5,379,093 by Hashimoto, et al.; and U.S. Pat. No. 5,231,663 by Earl, et al.; disclose methods of recognizing a copy restricted document by the scanning and analysis of some portion of the original document and comparison of the signal obtained with the signals stored in the copying device. When the signal of a copy restricted document is recognized, the copying process is inhibited. This method of restricting from the unauthorized copying of documents is limited in application because the signals of all documents to be copy restricted must be stored in or accessible by each copying device of interest. Because the number of potential documents to be copy restricted is extremely large and always increasing, it is impractical to maintain an updated signal database in the copying devices of interest.

Methods of encrypting a digital signal into a document produced by digital means have been disclosed. These methods introduce a signal which can be detected in a copying system utilizing document scanning and signal processing. These methods offer the advantage of not being detectable by an observer under normal conditions of use, thus maintaining the usefulness of high quality copy restricted documents. However, implementation of these methods is dependent on digital production of original documents. Although increasing, production of high quality documents using digital means is still limited. Accordingly, this approach is not useful for restricting the unauthorized copying of high quality documents produced using non-digital production methods.

U.S. Pat. No. 5,412,718 by Narasimhalu, et al.; discloses the use of a key associated with the physical properties of the document substrate which is required to decode the encrypted document. This method of restricting the unauthorized copying of documents is unacceptable for applications of interest to the present invention because it requires encryption of the original document rendering it useless prior to decoding.

U.S. application Ser. No. 08/598,778, filed Feb. 08, 1996 by John Gasper, et al., and titled, "Copy Restrictive System", and U.S. patent application Ser. No. 08/598,785, filed on Feb. 08, 1996, by John Gasper, et al., and entitled, "Copy Restrictive Documents" disclose pre-exposing color photographic paper to spots of blue light to produce an array of yellow microdots after chemical processing and a method of detecting these microdots during scanning performed by a digital printing device. Color photographic paper capable of forming yellow microdots after exposure to spots of blue light is of the color-negative type.

Finally, U.S. patent application Ser. No. 08/837,931 filed Apr. 11, 1997, by John Gasper, et al., and entitled, "Copy Restrictive System For Color-Reversal Documents" and U.S. Pat. No. 5,772,250 issued Jun. 30, 1997, by John Gasper, and entitled, "Copy Restrictive Color-Reversal Documents" disclose pre-exposing color-reversal photographic paper to spots of blue light to produce an array of minus-yellow microdots after chemical processing and a method of detecting these microdots during scanning performed by a digital printing device.

Many of the methods for making documents copy restrictive discussed above are based on recognition of a universal mark in documents that will prevent copying documents containing the mark. Once a copy system recognizes the document as containing such a copyright mark, the system is automatically prevented from copying the document without a key code. A problem with this type of system is that a universal key code may be distributed to all professional photographic developers, any one of which could the make copies of copyrighted photographs with out paying a fee to the copyright owner. Thus it would be desirable to have a mark and a key code that is specific to individual copyright owners.

SUMMARY OF THE INVENTION

An object of the present invention is to provide an apparatus for producing copy restrictive documents having a unique pattern that prevents copying by individuals other than the copyright owner.

Another object is to provide an apparatus to efficiently expose photographic media to a sparse array of microspots of colored light with precise two-dimensional spacing, intensity, and size.

An additional object of the invention is to provide a light source having a narrow spectral bandwidth.

Yet another object of the invention is to use multiple, individually addressable solid state light sources distributed sparsely along a line across a direction of motion of a media for producing a unique pattern of microdots.

Still another object of the invention is adjusting the radiant power emitted by individual light sources so as to provide a constant exposure intensity when additional optical elements are positioned between the light sources and the photographic media and when the output of the light sources varies for a fixed input power.

The present invention is directed to overcoming one or more of the problems set forth above. Briefly summarized, according to one aspect of the present invention, there is provided a system for creating copy restrictive media comprising printing a first pattern of microdots on a first set of documents and printing a second pattern of microdots on a second set of documents. A first key code is associated with the first microdot pattern, which allows a copy machine to copy the first set of documents, and a second key code is associated with the second microdot pattern, which allows a copy machine to copy the second set of documents.

According to one embodiment of the present invention a linear array is comprised of at least two spatially distributed light sources and an aperture mask for forming two or more microlight sources from the light sources. An optical element focuses light from the microlight sources onto a media moving relative to the linear array. An encoder turns the light sources on and off at regular intervals relative to movement of the media.

Another feature of the invention is the ability to precisely align and space solid state light emitters along a line and to synchronize the light pulses to generate a sparse array of microdots of colored light with a precise spacing in an orthogonal directions, to enable a software algorithm in an apparatus such as a digital copy print station to perform a discrete Fourier transform to verify the specific pitch of the two-dimensional array of microdots subsequently formed in the image created by the end user of the media after chemical processing of the media.

These and other aspects, objects, features, and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
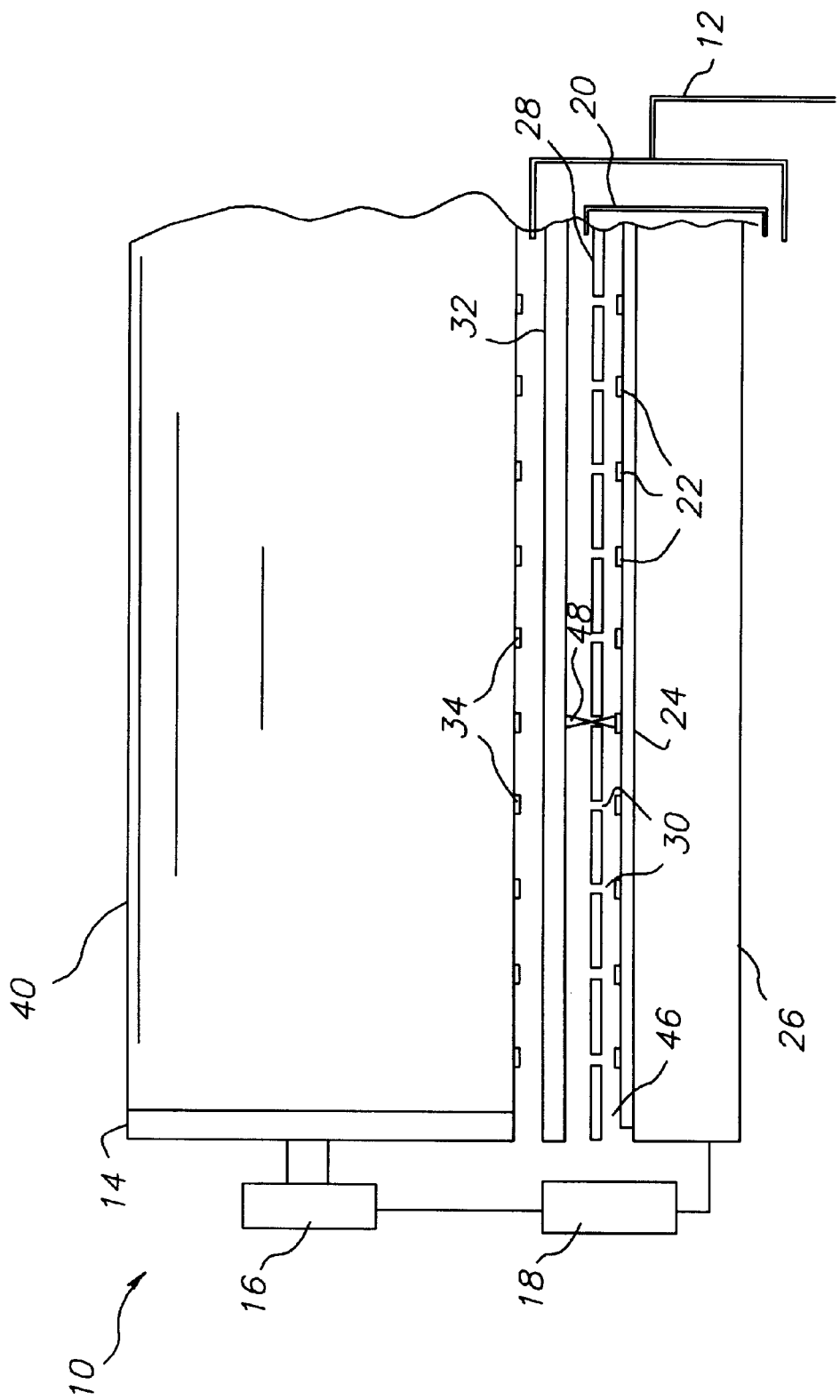
FIG. 1 is a plan view of an apparatus with a linear array of light emitting diodes (LED) according to the present invention.

Referring to FIG. 1, in its most general implementation, the inventive apparatus 10 to imparts to color photographic media and in particular color photographic paper a means of copyright protection. Apparatus 10 is comprised of a printhead 12, drum 14, encoder 16, electronic controller 18.

Printhead 12 is comprised of a linear array of light sources 20, aperture mask 28, and lens array 32. The linear array of light sources is composed of spaced, light emitting sources 22 such as inorganic or organic light-emitting diodes (LEDs) or laser diodes, that emit predominantly blue light in the range of wavelengths from 400 to 500 nanometers. The light emitting sources 22 are mounted on a ceramic or appropriate heat sink 24 which in turn is mounted on to a rigid metal base mount 26. Each of the light emitting sources 22 are separated from each adjacent source by at least 0.5 mm and preferably 1 mm. Each light emitting source has a maximum linear dimension of 0.3 mm, and preferably less than 0.2 mm.

Figure 2:
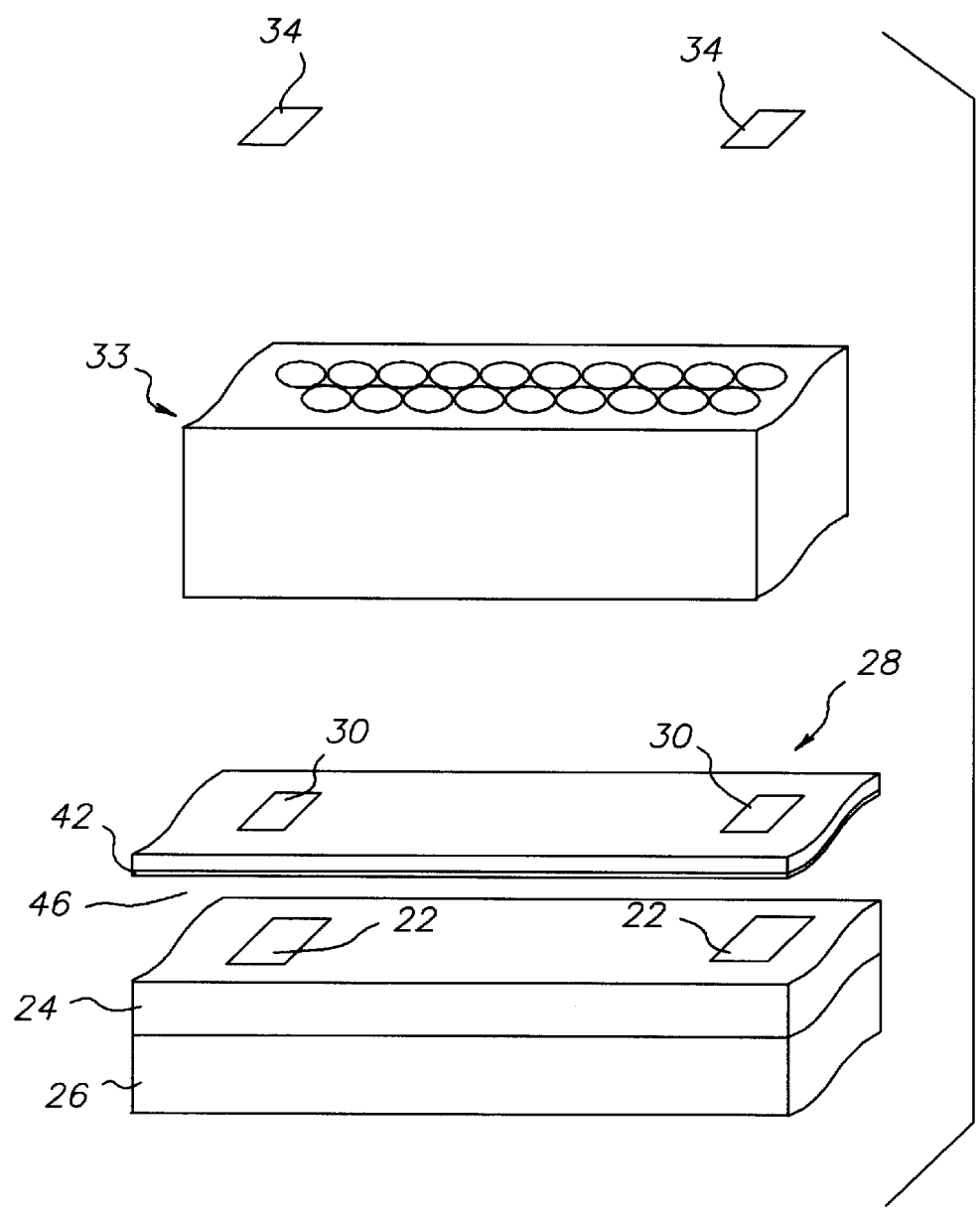
FIG. 2 is a perspective view of lens array and aperture mask for the apparatus shown in FIG. 1.

As shown in more detail in FIG. 2, the light from each light source 22 illuminates an appropriate aperture 30, in aperture mask 28, placed over each light source 22. The illuminated aperture is then imaged by a lens array 32 to a light sensitive media 40. In the preferred embodiment, lens array 32 is a gradient-index rod lens array 33 sold under the trademark Selfoc™, made by NSG America. In an alternate embodiment lens array 32 is a microlens array 35 of the type shown in FIG. 3.

Each aperture 30 in the aperture mask 28 is used to restrict the area of the emitted light that is being imaged onto the light sensitive media 40 so as to form a microspot 34 of focused light of a desired size on the media 40. Each aperture 30 is separated from each adjacent aperture by at least 0.5 mm and preferably 1 mm. Each aperture has a maximum linear dimension of 0.2 mm, and preferably less than 0.1 mm. A center of each aperture in the aperture mask is aligned coaxially with a center of each light source. After chemical processing of the exposed media, a colored microdot is formed in the color photographic media.

Figure 3:
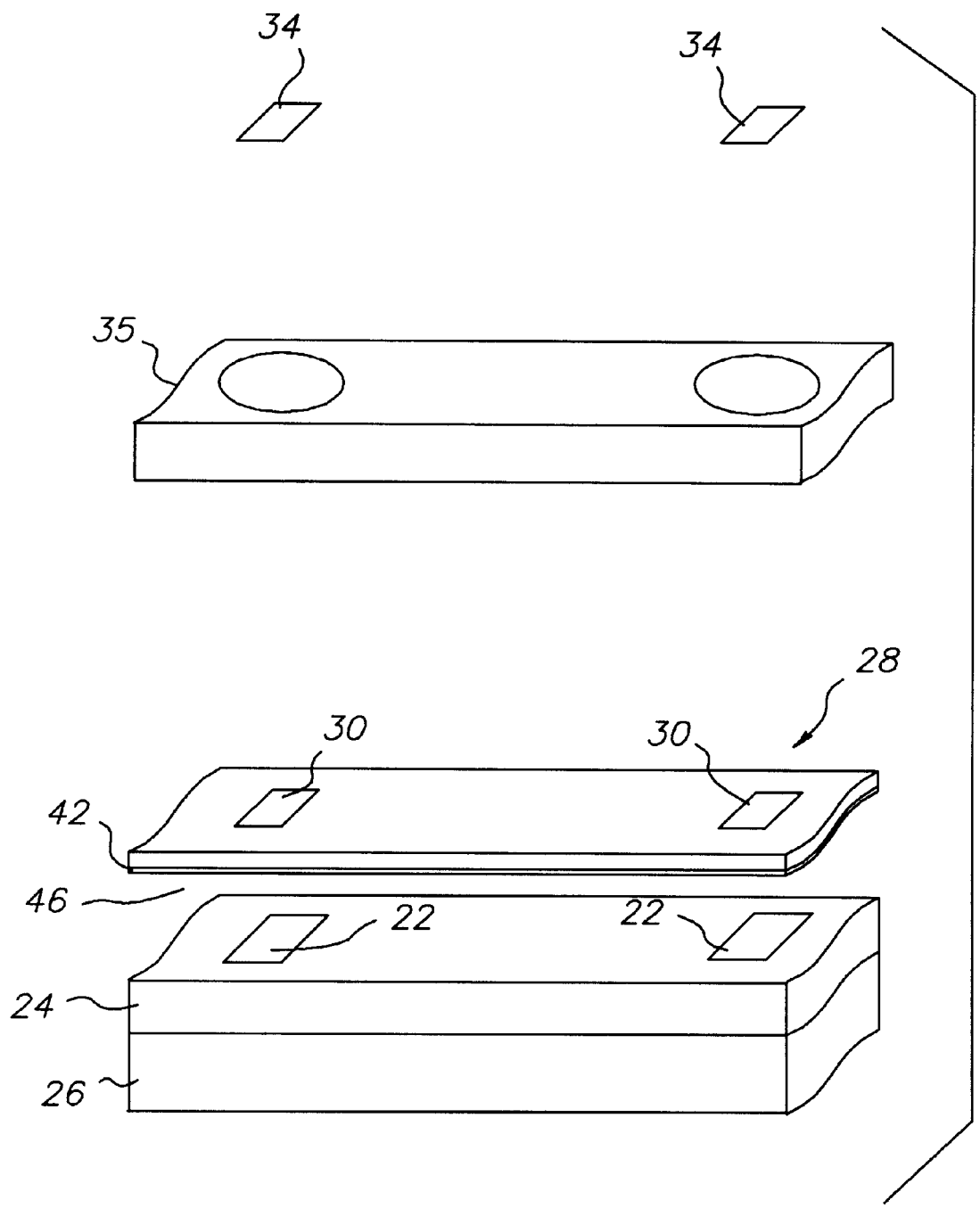
FIG. 3 is a perspective view of an alternate embodiment of a lens array for the apparatus shown in FIG. 1.

Aperture mask 28 is separated from the linear array of light sources 20 by a gap 46 shown in FIGS. 1–3. In the preferred embodiment gap 46 is at least 0.1 mm. Gap 46 provides a reduction in the angle subtended 48 by the light passing through the aperture, thereby reducing the working numerical aperture of the imaging optics to provide a sharper image with less flare and increased depth-of-focus than would otherwise be possible.

Also, the aperture mask may be coated with a filter material 42 that provides spectral filtration to block unwanted wavelengths of light. Filter material 42 may be placed anywhere between light sources 22 and the lens array 32. In one embodiment filter material is a multi-layer, dielectric, interference filter, and is coated on one surface of aperture mask 28.

The separation of the light emitting sources 22, and the concomitant separation of the apertures 30, determines the spacing between the microspots 34 of blue light in a transverse direction i.e. across the width of the media 40. To control the precise placement of microspots 34 in a longitudinal direction, a high resolution encoder 16 is mounted on drum 14. The drum 14 transports media 40. Encoder pulses are counted by electronic controller 18 to generate electrical timing signals necessary to pulse the linear array of light sources 20 at a precise pulse duration at precise intervals of time. For a given radiant power emitted by the light sources 22, the duration of the pulse (the time that the light source is on) is variable to obtain a desired exposure on the photographic media. The encoder 16 provides precise timing pulses irrespective of any media flutter, which enables precise location of the microdots at a desired pitch in the longitudinal direction. In some embodiments, it is desirable to keep the pitch of the microspots along the transverse and longitudinal directions the same.

By controlling the light pulse duration, the radiant power output from the light emitting sources 22, and the size of the aperture 30, the size and intensity of the microspot is controlled. The resulting controlled exposure received by the photographic media results in a two-dimensional array of microspots of desired size and exposure to the media. After chemical processing of the media there is formed in the media colored microdots of the desired size, spacing, and optical density.

One of the important attributes of the present invention is the precise placement of the microspots of focused light onto the media. After exposure and chemical processing of silver halide photosensitive media, an image subsequently recorded by an end user will contain microdots of the same spacing. This photographic print is rendered copy restrictive. When an unauthorized attempt is made to copy the print using a copy machine, for example, a digital printing station, a detection means identifies the unique pattern of microdots and prevents operation of the copy machine.

An important aspect of this detection means is the performance of a Fourier transform to identify the spatial frequency or frequencies of the two-dimensional pattern. Without accurate positioning of the microspots of light onto the media with adequate precision and repeatability of location, as well as maintaining a constant radiant energy for all microspots for all exposed media, it would be far more difficult to develop a robust software algorithm having a high probability of detecting a pattern that identifies the media as copy restrictive when this pattern is accompanied by a complex scene imparted to the media by the end user such as a photograph.

Another important aspect of the present invention is maintaining an equal radiant energy to the media for all microspots. In the preferred embodiment employing LEDs, an aperture mask, and a Selfoc™ array, it is necessary to adjust the applied voltage to each LED in order to obtain an equal energy exposing the media This is due in part to variations in the operating characteristics from one LED to another, variation in the open area of the apertures from one aperture to another, and a variation in the brightness of the Selfoc™ image when the position of each micro-light source varies with respect to the spatial arrangement of the gradient-index rod lenses in the Selfoc™ linear array.

Another important feature of the present invention is the exposure of the media with a sparse array of microspots covering typically less than 1% of the surface area. This is necessary to prevent an increase in the minimum optical density of the media. Therefore, the duty cycle of the light sources, that is, the fraction of the time the light source is on and exposing the media is very low, typically less than 5%. This low duty cycle provides extended operating life for the LEDs or laser diodes.

Figure 4:
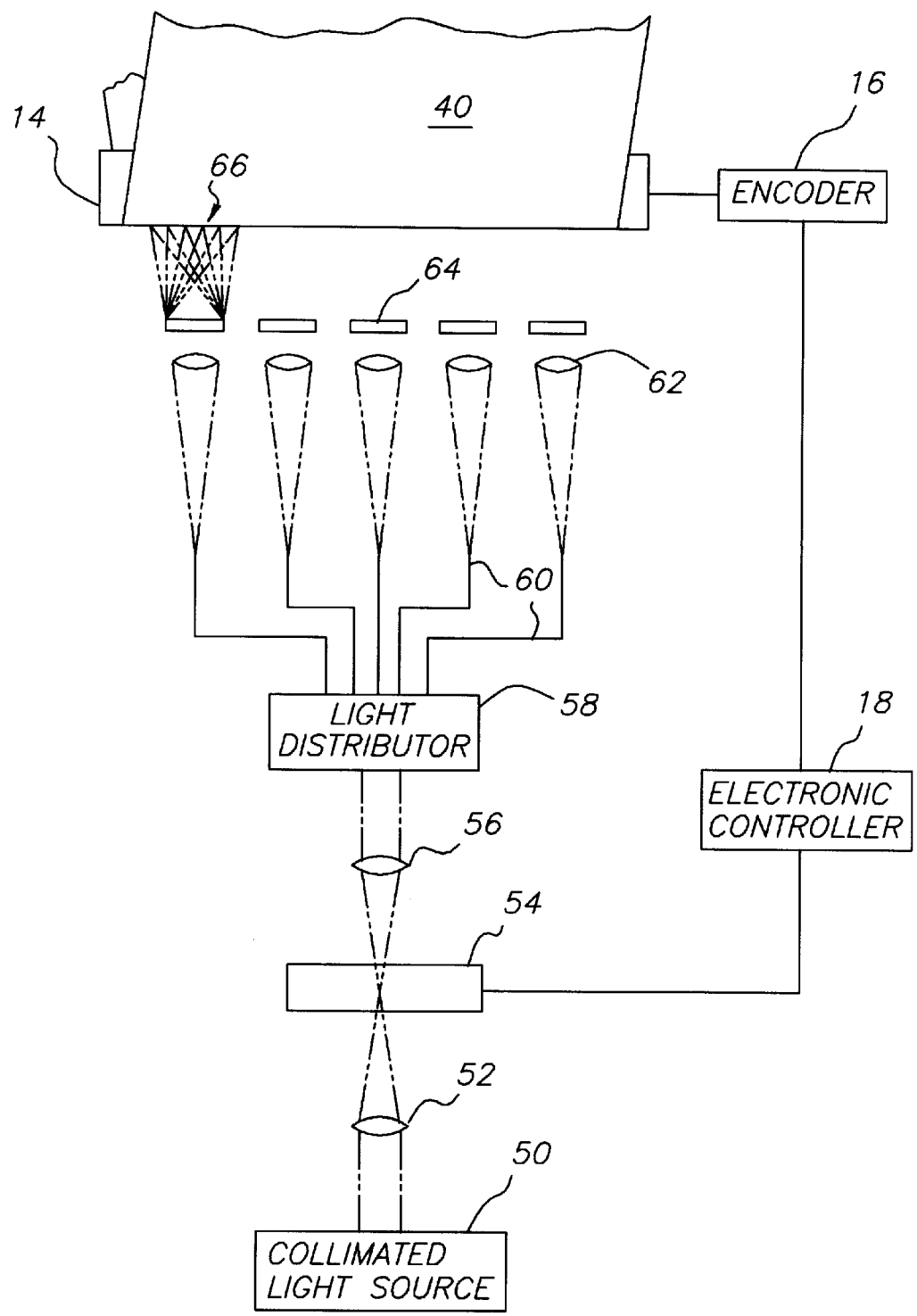
FIG. 4 is a plan view of another embodiment of the invention using optical fibers and a Dammann filter.

FIG. 4 shows an alternate embodiment of an apparatus for creating copy restrictive media comprising a collimated light source 50, focused to a light modulator 54, recollimated to a light distributor 58, which distributes light to multiple optical fibers 60. The distal ends of the optical fibers 60 are aligned into a widely spaced linear array at a common plane. Light from the distal end of each of the optical fibers 60 is focused by a lens 62. A Dammann filter 64 positioned adjacent to each lens 62 forms at least two microspots 66 along a line transverse to a direction of travel of the media 40. Encoder 16 and electronic controller 18 function as described above.

Figure 5:
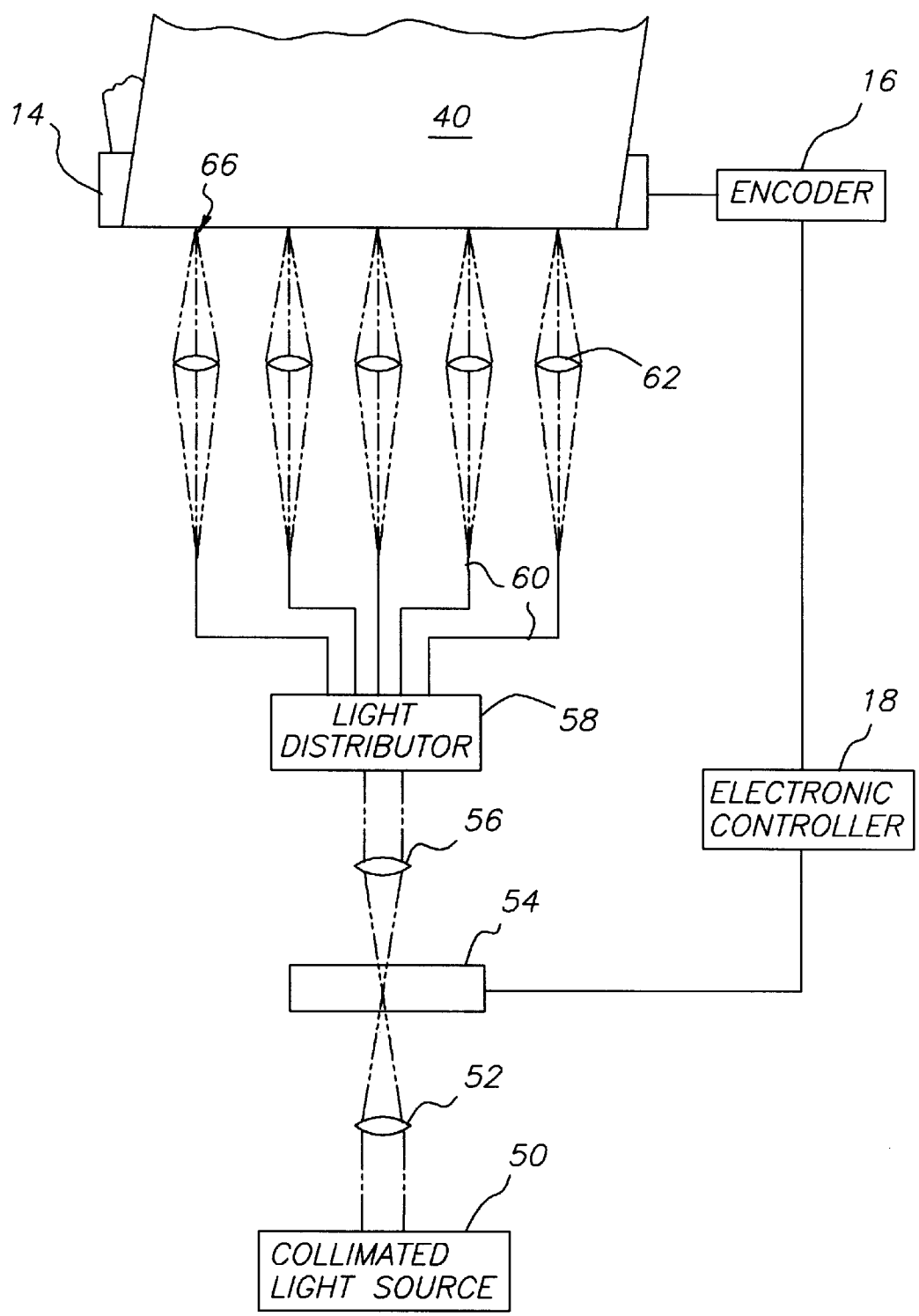
FIG. 5 is a plan view of yet another embodiment of the invention using a micro lens array.

FIG. 5 shows another embodiment of an apparatus for creating copy restrictive media comprising a collimated light source 50, focused to a light modulator 54, recollimated to a light distributor 58, which distributes light to multiple optical fibers 60. The distal ends of the optical fibers 60 are aligned into a widely spaced linear array at a common plane. Light from the distal end of each of the optical fibers 60 is focused by a lens 62 to the media 40 to form a microspot 66 along a line transverse to the direction of travel of the media 40. Encoder 16 and electronic controller 18 function as described above.

Figure 6:
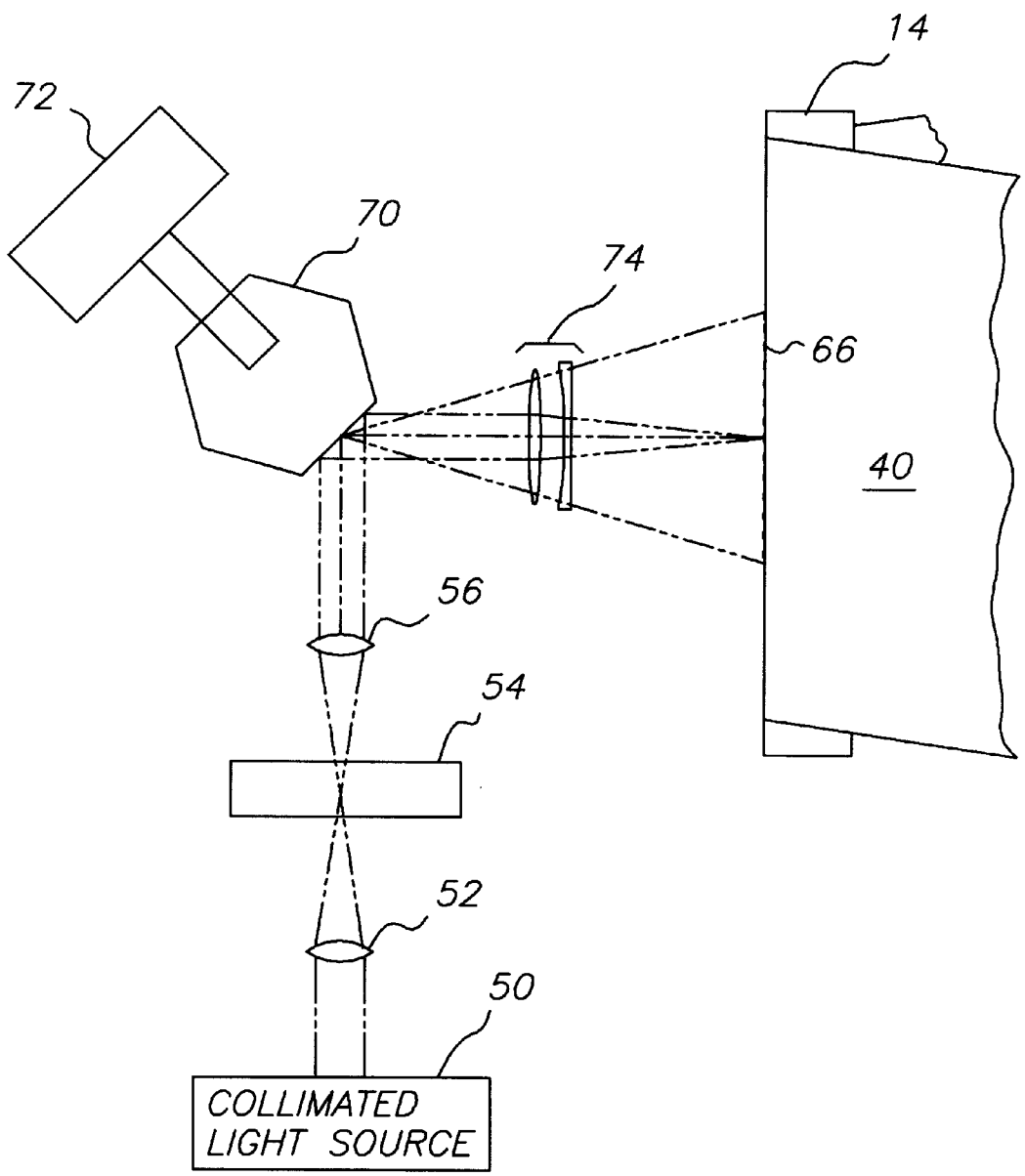
FIG. 6 is a plan view of an alternate embodiment of the invention using a rotating polygon.

FIG. 6 shows yet another embodiment of an apparatus for creating copy restrictive media comprising a collimated light source 50, focused to a light modulator 54, recollimated by a lens 56. The collimated beam is scanned across media 40 by rotating polygon 70. An f-theta lens 74, located between polygon 70 and media 40, focuses the scanning beam to microspots 66 in a direction transverse to the direction of travel of the media. Driver 72 rotates polygon 70. Encoder 16 and electronic controller 18 function as described above.

Figure 7:
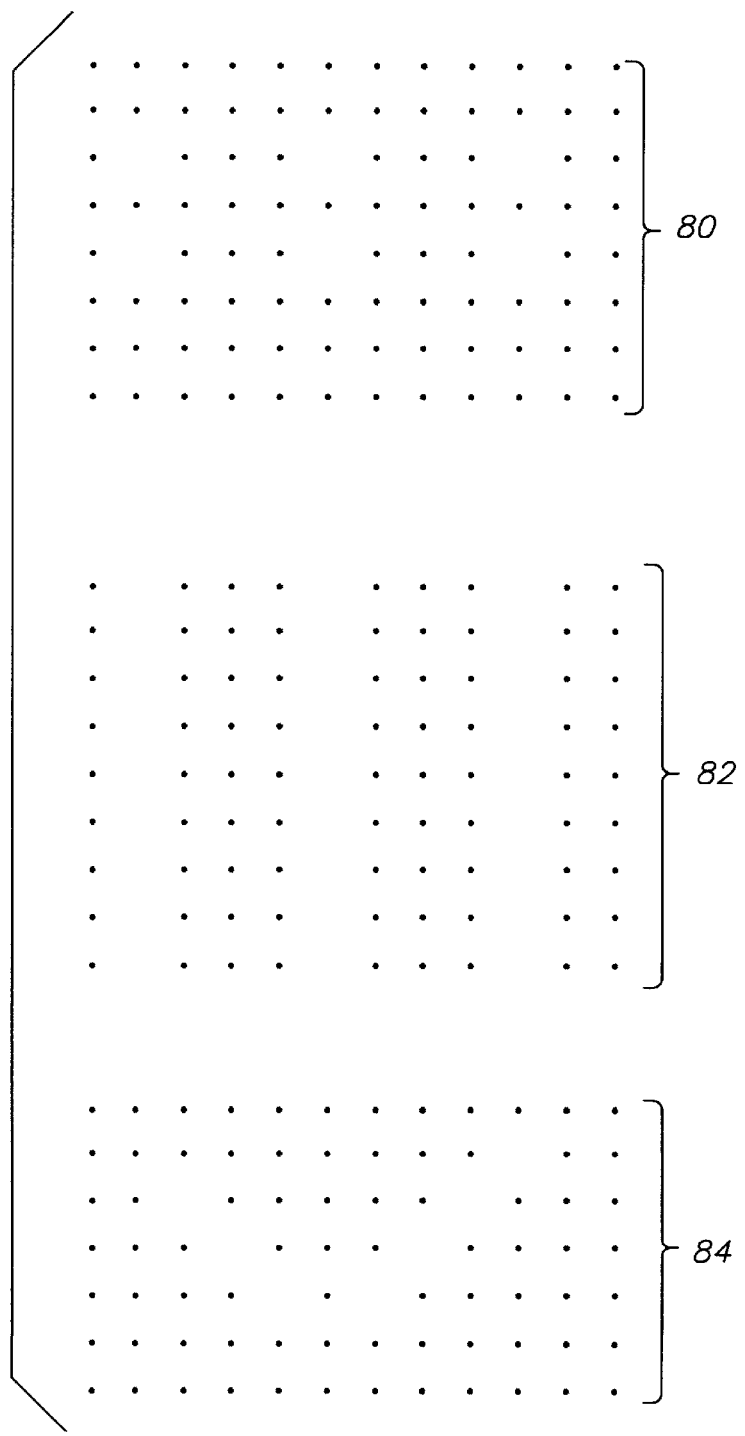
FIG. 7 is a plan view of microdot patterns that is produced by the apparatus in FIG. 1.

Referring to FIG. 7, a series of microdot patterns 80, 82, and 84 are shown produced by an LED apparatus such as shown in FIG. 1. Each of the specific patterns are produced by writing a unique sequence of pulses from selected LEDs. The microdot pattern 80 was formed by turning off LEDs at columns 2, 6, and 10; in line 3 and line 5. This microdot pattern would then be repeated after line 8. The microdot pattern produced in 82 is achieved by not exposing columns 2, 6 and 10. The microdot pattern in 84 is produced by turning off LEDs in a staggered sequence, for example column 3 in line 3, column 4 in line 4, etc. Each of these unique microdot patterns would be placed on photograph paper sold to a particular customer, and only that customer would be given the key code to unlock copy machines to copy a photograph produced on that paper.

Figure 8:
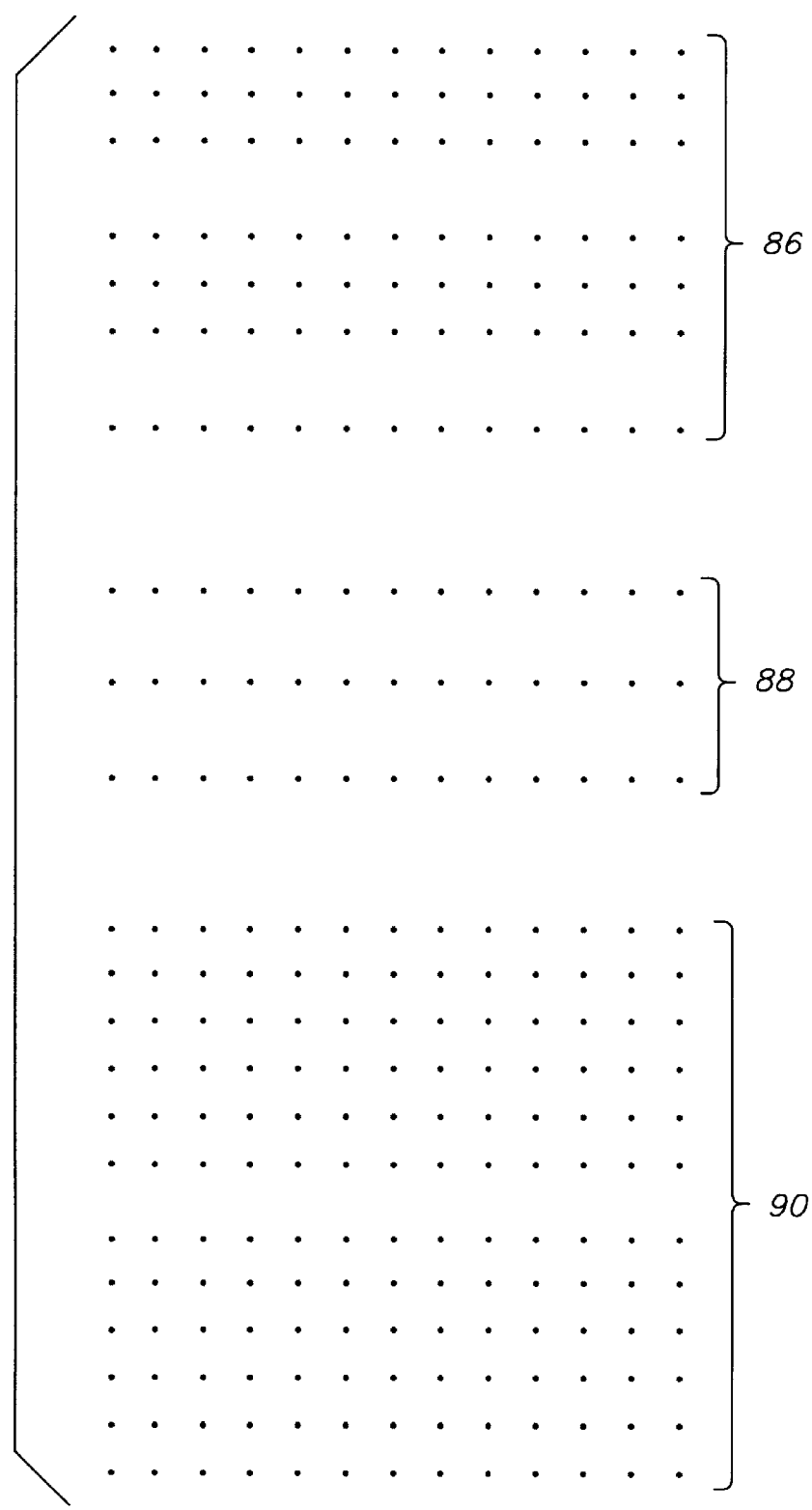
FIG. 8 is a plan view of microdot patterns that is produced by the apparatus in FIGS. 1, 4, and 5.

Referring to FIG. 8, another series of microdot patterns 86, 88, and 90 are shown. These microdot patterns are produced by a collimated light source, such as the apparatus shown in FIGS. 4–6 and show some of the microdot patterns that may be produced by writing a unique sequence of pulses from the modulated light source. The arrows show the direction of travel of the media. The microdot pattern in 86 has every fourth row deleted, the pattern in 88 has every other row deleted, and the pattern in 90 has every seventh row deleted.

Figure 9:
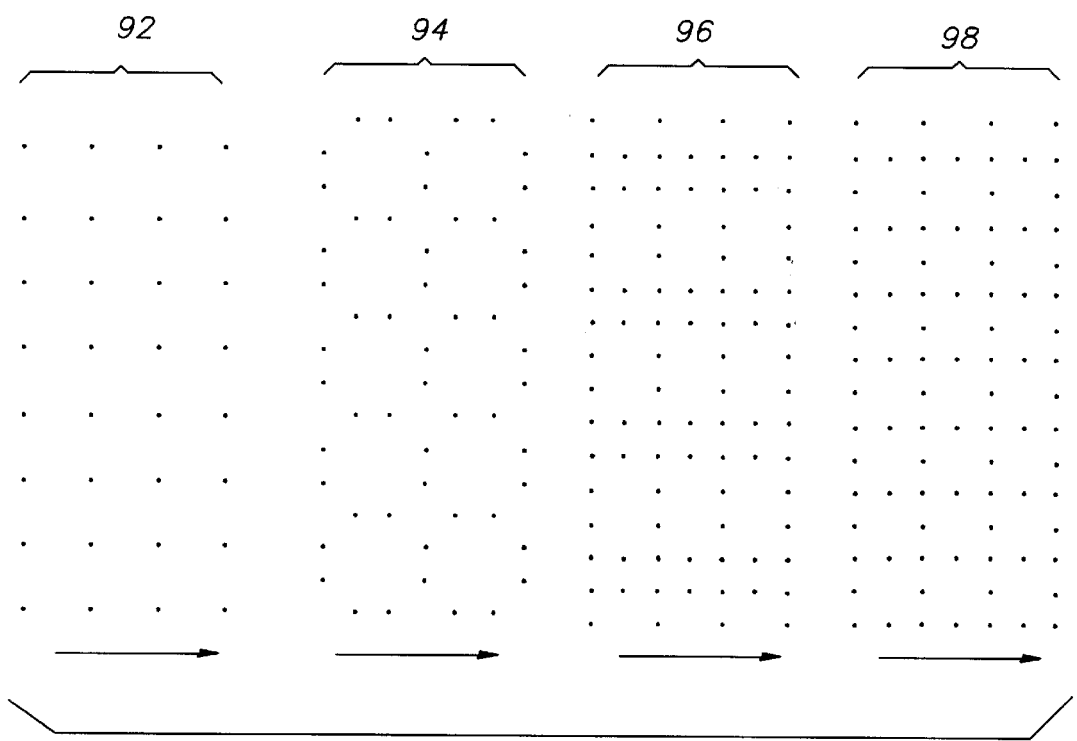
FIG. 9 is a plan view of microdot patterns that is produced by the apparatus in FIGS. 1, 4, and 5.

In a similar manner, FIG. 9 shows additional microdot patterns. Microdot pattern 92 has alternate microdots in odd number rows and no microdots in even numbered rows. Microdot pattern 94 is a hexagonal pattern. Microdot pattern 96 illustrates an alternating pattern of two rows of regularly spaced microdots and two rows of microdots in which alternate microdots are missing. Microdot pattern 98 has regularly spaced microdots in even numbered rows and a one on, one off spacing in odd numbered rows.

In the preferred embodiment of the invention, the microdot pattern is formed to produce a Fourier transform when scanned. This makes detection of the microdot pattern by a software algorithm easier than using other systems. A unique key code to unlock copy machines is assigned to customers. Thus customers using photographic paper with a microdot pattern matching the key code will be able to copy photographs made on that paper, but other individuals will not be able to make copies.

The invention has been described in detail with particular reference to certain preferred embodiments thereof, but it will be understood that variations and modifications can be effected within the spirit and scope of the invention.

PARTS LIST 10 the inventive apparatus
12 printhead
14 drum
16 encoder
18 electronic controller
20 linear array
22 light emitting sources
24 ceramic or appropriate heat sink
26 metal base mount
28 aperture mask
30 apertures
32 lens array
33 gradient-index rod lens array
34 microspot
35 microlens array
40 light sensitive media
42 filter material
46 gap
48 angle subtended
50 collimated light source
52 lens
54 modulator
56 lens
58 light distributor
60 optical fiber
62 lens
64 Dammann filter
66 focused microspots
70 polygon
72 driver
74 f-theta lens
80 unique pattern
82 unique pattern
84 unique pattern
86 unique pattern
88 unique pattern
90 unique pattern
92 unique pattern
94 unique pattern
96 unique pattern
98 unique pattern

What is claimed is:

1. A system for creating copy restrictive documents with individual key codes comprising:

printing a first pattern of microdots on a first set of documents;

printing a second pattern of microdots on a second set of documents;

a first key code associated with said first microdot pattern wherein said first key code unlocks a copy machine to allow reproduction of said first set of documents; and a second key coded associated with said second microdot pattern wherein said second key code unlocks a copy machine to allow reproduction of said second sets of documents.

2. A system as in claim 1 wherein said first key code is a Fourier transform of said first microdot pattern.

3. A system as in claim 1 wherein said first pattern of microdots is produced by omitting alternate columns of microdots.

4. A system as in claim 1 wherein said first pattern of microdots is produced by omitting alternate columns of microdots and alternate rows of microdots.

5. A system as in claim 1 wherein a second key code is associated with said second microdot pattern wherein said second key code unlocks a copy machine to allow reproduction of said second set of documents.

6. A method for producing copy restrictive documents comprising the steps of:
- printing a first pattern of microdots on a first set of documents;
- printing a second pattern of microdots on a second set of documents;
- generating a first key code associated with said first microdot pattern wherein said first key code unlocks a copy machine to allow reproduction of said first set of documents; and
- generating a second key code associated with said second microdot pattern wherein said second key code unlocks a copy machine to allow reproduction of said second set of documents.

7. A method as in claim 6 wherein a first customer is assigned said first key code.

8. A method as in claim 6 wherein a second customer is assigned said second key code.

9. An apparatus for creating copy restrictive media comprising:
- a linear array comprised of at least two spatially distributed light sources;
- an aperture mask for forming two or more micro-light sources from said light sources;
- an optical element for focusing light from said micro-light sources onto first a media and a second media;
- wherein said first media and said second media are each moved sequentially transverse to said linear array;
- an encoder for turning said light sources on and off at regular intervals relating to movement of said media; and
- wherein a first pattern of microdots is printed on said first media and a second pattern of microdots is printed on said second media.

* * * * *